United States Patent
Yamane (10) Patent No.: US 8,483,548 B2
(45) Date of Patent: Jul. 9, 2013

(54) DIGITAL BROADCAST RECORDING APPARATUS

(75) Inventor: Takeshi Yamane, Yokohama (JP)

(73) Assignee: Kyocera Corporation, Kyoto (JP)

(*) Notice: Subject to any disclaimer, the term of this patent is extended or adjusted under 35 U.S.C. 154(b) by 293 days.

(21) Appl. No.: 12/810,817

(22) PCT Filed: Dec. 26, 2008

(86) PCT No.: PCT/JP2008/073846
§ 371 (c)(1),
(2), (4) Date: Sep. 16, 2010

(87) PCT Pub. No.: WO2009/084679
PCT Pub. Date: Jul. 9, 2009

(65) Prior Publication Data
US 2011/0019971 A1    Jan. 27, 2011

(30) Foreign Application Priority Data

Dec. 27, 2007  (JP) ................... 2007-337060

(51) Int. Cl.
*H04N 9/80* (2006.01)
*H04N 7/16* (2011.01)
*H04N 7/167* (2011.01)

(52) U.S. Cl.
USPC ........... 386/257; 386/252; 386/255; 386/258; 386/259; 386/260; 725/25; 725/27; 725/31

(58) Field of Classification Search
USPC .... 386/252, 255, 257, 258, 259, 260; 725/25, 725/27, 31
See application file for complete search history.

(56) References Cited

U.S. PATENT DOCUMENTS 6,802,074 B1 * 10/2004 Mitsui et al. .................... 725/25
2012/0033938 A1 * 2/2012 Shima et al. ................... 386/231

FOREIGN PATENT DOCUMENTS

| JP | 08-102922 | 4/1996 |
| JP | 10-269752 | 10/1998 |
| JP | 2000-341156 | 12/2000 |
| JP | 2003-134456 | 5/2003 |
| JP | 2003-333492 | 11/2003 |
| JP | 2004-080476 | 3/2004 |
| JP | 2006-025398 | 1/2006 |

OTHER PUBLICATIONS

Office Action for Korean Patent Application No. 10-2010-7014129, mailed Oct. 26, 2011, 5 pages (including English translation).
International Search Report for PCT/JP2008/073846, mailed on Apr. 7, 2009, 2 pages.
Office Action for Korean Patent Application No. 10-2010-7014129, mailed Jun. 28, 2012, 7 pages (including English translation).
JP 2007-337060 Office Action dated Oct. 9, 2012.

* cited by examiner

Primary Examiner — Daquan Zhao
(74) Attorney, Agent, or Firm — Duane Morris LLP (57) ABSTRACT

The digital broadcast recording apparatus (100) includes a recording unit (160) for recording digital broadcast, a detection unit (170) for detecting a packet containing information regarding a portion permitted to be recorded from a stream of a program prohibited from being recorded in the digital broadcast, and a control unit (140) for controlling, when the recording unit (160) records the program prohibited from being recorded, the recording unit (160) to record the portion permitted to be recorded based on the information contained in the packet detected by the detection unit (170).

3 Claims, 11 Drawing Sheets

L1 {
Broadcast station name: ××× broadcast
Broadcast channel: UHFxxch
Program name: ○○○ Music channel
Broadcasting hours: 20:00-20:54
Recordable points:
1: 12345678
2: 12345777~12345800
3: 12346215
}

FIG. 7

L2 {
Broadcast station name: ××× broadcast
Broadcast channel: UHFxxch
Program name: ○○○ Music channel
Broadcasting hours: 20:00-20:54
Recordable points:
1: 12345678~12345750
    (Genre: Entertainment keywords: Guest 1, appearance)
2: 12345777~12346000
    (Genre: Entertainment keywords: Guest 1, performance)
3: 12346215~12346300
    (Genre: CM keywords: car, new release)
4: 12346333~12346800
    (Genre: Entertainment keywords: Guest 2, appearance)
5: 12347200~12348000
    (Genre: Entertainment keywords: Guest 2, performance)
}

DIGITAL BROADCAST RECORDING APPARATUS

CROSS REFERENCE TO RELATED APPLICATIONS

This application is a U.S. National Phase of International Application No. PCT/JP2008/073846 filed Dec. 26, 2008 which claims priority to and the benefit of Japanese Patent Application No. 2007-337060 filed on Dec. 27, 2007, the contents of which are incorporated herein by reference in their entirety.

TECHNICAL FIELD

The present invention relates to digital broadcast recording apparatuses and, in particular, to recording apparatuses capable of recording a portion that is permitted to be recorded in a program that is prohibited from being recorded.

BACKGROUND ART

Some digital broadcast receivers have a recording function for recording a program being watched and a function, called a still image capture function, for recording one scene of a program. However, in terms of protection of copyright, protection of interests of a program creator (content holder) and the like, digital broadcast program content is controlled based on copy control information embedded previously by the program transmission side. For example, the digital broadcasting is operated currently using a so-called copy once or copy never scheme that places restrictions on copying a recorded program from a primary storage destination (a DVD recorder) to a secondary storage destination (an HDD, etc.). This copy control information is set by a content provider and a service provider who provide program content. These copy controls such as the copy once and copy never according to the conventional art can be carried out by copy control descriptors in the PMT (Program Map Table) in the case of digital broadcasting, for example. Further, in the case of BS/CS digital broadcasting and the like, there are some cases of scrambling broadcast signals to apply restrictions on copying. For example, controls are performed so that some contents can be watched for free without being scrambled and some contents that are required to be paid are scrambled and can be watched only by a user who pays to obtain key data for descrambling the contents.

In addition, the still image capture function has a function similar to the recording function in respect of recording one frame of video, and thus is subjected to restriction by the copy control information in the same manner as the recording function. Further, as to the still image capture function, the user who is watching a program captures (records) video by performing recording operations using this function at any timing. However, the user needs to watch a screen all the time to capture, which impairs usability. Further, there may be some cases where capture cannot be performed at a timing desired by the user due to a time lag for the capture operation. On the other hand, in order to present a scene desired by the user from the video data that has been captured previously, there is a technique for performing capture based on the presentation time (time stamp) of the video to find the video data corresponding to the presentation time specified by the user (see Patent Document 1). Relating to this conventional art, in order to solve the above problem that the user needs to watch a screen all the time, for example, there is a method for programming a recorder to record and store a part of the video such as one scene or one frame of the video in advance. As an example, when the user wants to record only one part, such as one scene or, for example, one song of a music program, there has been considered a method for programming a recorder to record content by specifying the channel No., the time to start recording and the time to finish recording. However, since broadcasting is one-directional transmission, it is impossible to recognize previously the point of still image the user wants to capture. Therefore, it is highly likely that, even if time is specified finely such as by the minute, a desired video or one frame of the video cannot be captured.

As mentioned above, in the present circumstances, although copying program content that has been recorded (video and audio recording) is controlled, recording of program content in real time and video capture are not prohibited. However, in the future, recording in real time or capture may be restricted with the introduction of pay-TV into the terrestrial digital broadcasting or depending on operation of each broadcast station. In that case, with the existing standard by the ARIB (Association of Radio Industries and Businesses), that is, a scheme in which copy control descriptor is included in the PMT, the restriction range of recording can be specified only at a program level, that is, an ES (Elementary Stream) level. Because of this, a content holder or a service provider cannot utilize flexible recording restrictions such as recording of one portion or capture of a certain one scene of a program. In other words, a viewer cannot record a CM in a program prohibited from being recorded and the useful information for the viewer such as a giveaway entry address that is broadcasted as a part of the program. Thus usability is impaired. Further, it has a problem that a program creator cannot get advantages from recording of the information by the user (the CM goods will be known in the market).

It is obvious that if the real-time recording is prohibited, capture of a still image of a program that is prohibited from being recorded is also prohibited in the same manner. Even if recording one portion of a program is allowed, a user cannot program a recorder to record the portion by specifying the time as in the above case unless the information thereof is provided to the user previously. In other words, even if the user programs the recorder to record a portion of a certain program by specifying (program) the time, there is a concern that broadcasting hours of a program scheduled before the program to record may be extended and the programmed time is thus different from the broadcasting hours of the program the user wants to record. Consequently, the portion corresponding to the specified time may span the portion which is prohibited from being recorded. For example, if the programmed time period for recording is set longer, the desired portion permitted to be recorded can be recorded. However, the portion prohibited from being recorded cannot be recorded properly and recorded, for example, as a black screen or as a scrambled screen, which will not only become an eyesore to the user but also occupy memory of the recording apparatus wastefully, and thus it is unfavorable.

Patent Document 1: Japanese Patent Application Laid-Open No. 2004-080476

SUMMARY OF INVENTION

Technical Problems

Therefore, it is an object of the present invention to provide a new scheme of digital broadcasting, that is, a recording apparatus of program content of digital broadcasting, which allows a user to record useful information for both the user and a content holder by a method with good usability while prohibiting recording of program content of digital broadcasting in order to protect the program content.

Solutions to Problems

In order to solve the above problems, a digital broadcast recording apparatus according to the present invention includes a recording unit for recording digital broadcast, a detection unit for detecting, from a stream of a program (broadcasting range) prohibited from being recorded in the digital broadcast, a packet containing information regarding a portion permitted to be recorded in the program prohibited from being recorded and a control unit for controlling, when the recording unit records the program prohibited from being recorded, the recording unit to record the portion permitted to be recorded based on the information contained in the packet detected by the detection unit.

In addition, in the digital broadcast recording apparatus according to the present invention, the detection unit detects a PES packet that includes a flag indicating that recording is permitted in a header, and the control unit controls the recording unit to record, in the program prohibited from being recorded, content (a video frame and/or an audio frame) contained in the PES packet that includes the flag in the header.

Further, in the digital broadcast recording apparatus according to an embodiment of the present invention, the information regarding the portion permitted to be recorded is information regarding a presentation time of the portion permitted to be recorded, and the control unit controls the recording unit to record, in the program prohibited from being recorded, a portion to be presented at the presentation time.

Moreover, another digital broadcast recording apparatus according to the present invention includes a recording unit for recording digital broadcast, an acquisition unit for acquiring recording permission information indicating a portion permitted to be recorded in a program (broadcasting range) prohibited from being recorded in the digital broadcast program, a storage unit for storing the recording permission information acquired by the acquisition unit and a control unit for controlling, when the recording unit records the program prohibited from being recorded, the recording unit to record the portion permitted to be recorded based on the recording permission information stored in the storage unit.

Further, in the digital broadcast recording apparatus according to an embodiment of the present invention, the recording permission information is information regarding a presentation time of the portion permitted to be recorded and the control unit controls the recording unit to record a portion to be presented at the presentation time in the program prohibited from being recorded.

Advantageous Effects on Invention

According to the present invention, when recording of digital broadcast is prohibited on a program basis, since recording of a portion of the program can be permitted, the user can record information that is useful for both the user and a content holder in a flexible method with the good usability, while protecting the content by the content holder.

REFERENCE SIGNS LIST

100A, B recording apparatus
110 broadcast reception unit
120 demultiplexer
130 decoder
140A, B control unit
142A, B determination unit
150 data storage unit
160 recording unit
170 detection unit
180 recording permission information storage unit
190 communication unit
200 broadcast apparatus
210 program information acquisition unit
220 recording permission information creation unit
230 stream generation unit
240 transmission unit
250 memory
260 antenna
300A, B server
310 recording permission information acquisition unit
320 EPG creation unit
330 memory
NET network
ANT 1, 2 antenna
DIS display unit
SP audio output unit
KEY input unit
L1, L2 time stamp list
L3 recordable time list
CUR cursor
MK1, MK2 mark
RA reserved area

DESCRIPTION OF THE PREFERRED EMBODIMENTS

Figure 1:
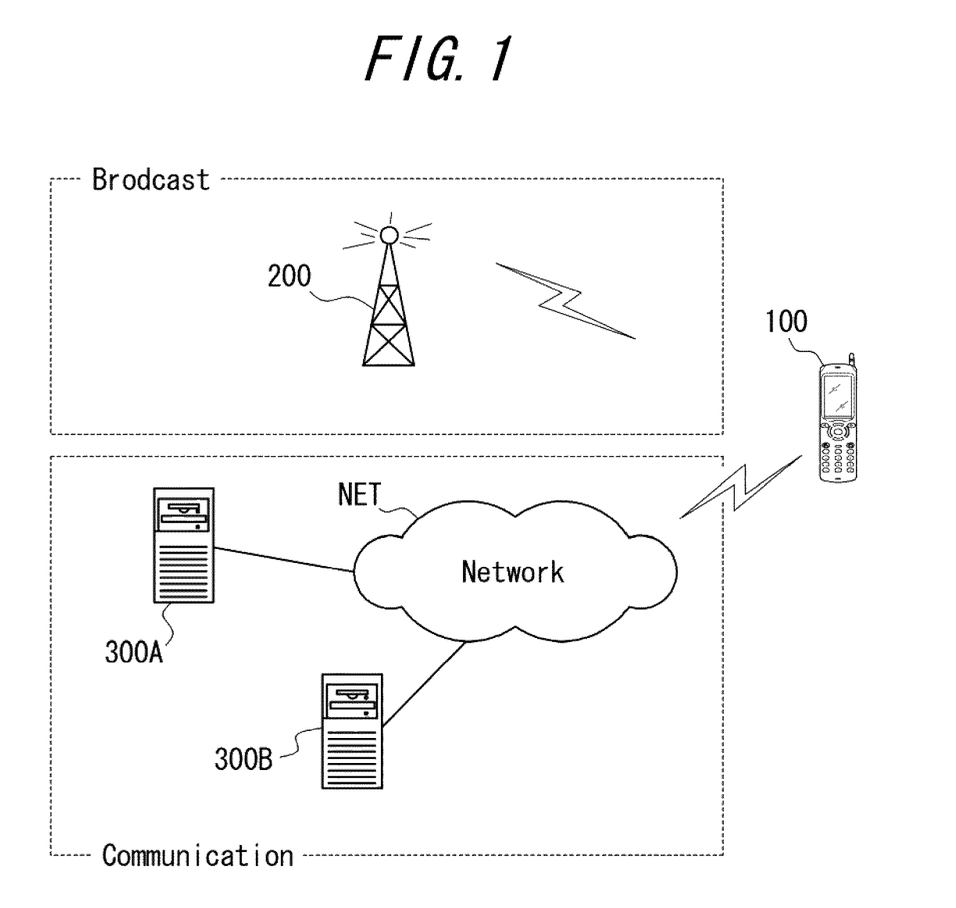
FIG. 1 is a configuration diagram of a broadcast system constituted by a digital broadcast recording apparatus to which the present invention is applied, a transmission apparatus (broadcast station) for proving broadcasting waves thereto and a server for providing various kinds of services through a network.

Embodiments of the present invention are described below in detail with reference to the drawings. FIG. 1 is a configuration diagram of a broadcast system constituted by a digital broadcast recording apparatus to which the present invention is applied, a transmission apparatus (broadcast station) for proving broadcasting waves thereto and a server for providing various kinds of services through a network. As shown in the figure, the broadcast system is constituted by a digital broadcast recording apparatus 100, a transmission apparatus 200, and servers 300A and 300B that provide various kinds of services to the digital broadcast recording apparatus 100 through a network NET. The various kinds of services provided by the servers 300A and 300B include, for example, information of the programs broadcasted by the transmission apparatus 200, EPG (Electric Program Guide) and the like. The EPG can be acquired also from broadcasting waves from the broadcast apparatus 200. In addition, in FIG. 1 and the following description, although the digital broadcast recording apparatus 100 is assumed to be a mobile communication terminal, it can be any apparatus that records a digital broadcast. Further, as a recording apparatus, the present invention can be applied widely to portable electronic devices such as cellular phones, PDAs (Personal Digital Assistance), portable game players, portable video players, portable electronic book viewers and the like. In addition, as to the terrestrial digital broadcast, description is given in terms of a one-segment broadcast, but it is not limited thereto. Further, the "recording apparatus" in the following description refers to a "digital broadcast recording apparatus". Moreover, "recording" includes continuous recording such as, for example, recording from the beginning to the end of a program and recording of one frame only such as a still image capture function or continuous capture.

Figure 10:
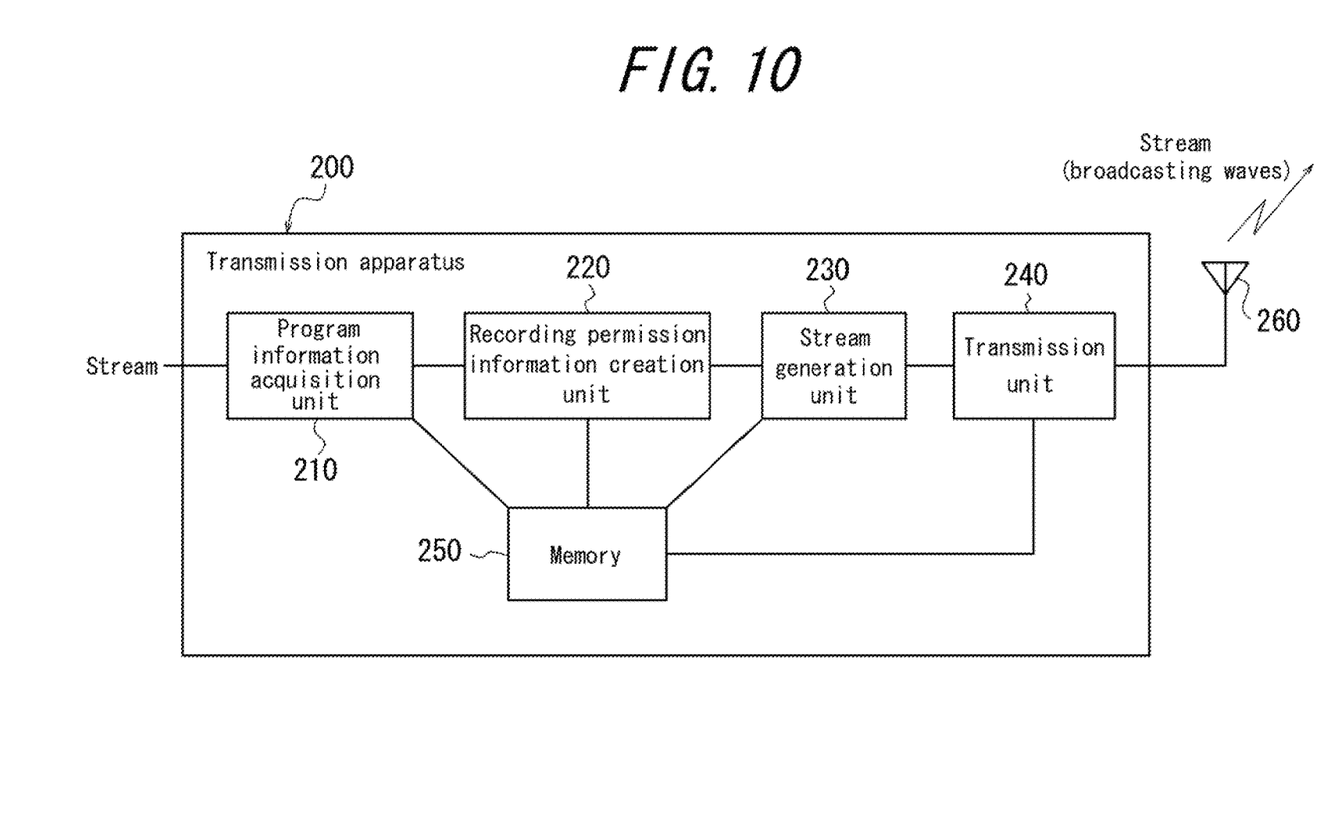
FIG. 10 is a schematic block diagram of a transmission apparatus.

First, description of the transmission apparatus (broadcast apparatus) 200 is given below. FIG. 10 is a schematic block diagram of the transmission apparatus (broadcast apparatus). The transmission apparatus 200 includes a program information acquisition unit 210, a recording permission information creation unit 220, a stream generation unit 230, a transmission unit 240, a memory 250 and an antenna 260. The transmission apparatus 200 receives a stream that includes program content, and the information regarding the program content is acquired by the program information acquisition unit 210. The information indicates whether recording of the program content is prohibited or not, and if recording is prohibited, whether a portion permitted to be recorded exists or not, where the portion permitted to be recorded is, and the like, and such information can be set by a content creator as desired. The acquired information is stored in the memory 250 or output directly to the recording permission information creation unit 220. The recording permission information creation unit 220 creates, based on the information that is output from the program information acquisition unit 210 or read out from the memory 250, the recording permission information indicating a portion that is permitted to be recorded in the program content. More specifically, the recording permission information is information which enables discrimination of a portion (video/audio frame) that is permitted to be recorded such as a list of time (time stamp) at which the portion permitted to be recorded in the program content is presented, for example. The stream generation unit 230 generates a stream so that the recording permission information created by the recording permission information creation unit 220 is contained in a packet header of a PES packet. Then the stream generation unit performs an appropriate (predetermined) process on the stream that has been generated to generate a TS (Transport Stream) and outputs the TS to the transmission unit 240. Thereafter the transmission unit 240 transmits (broadcasts) the stream generated by the stream generation unit 230 from the antenna 260 through broadcasting waves (RF signals).

Figure 11:
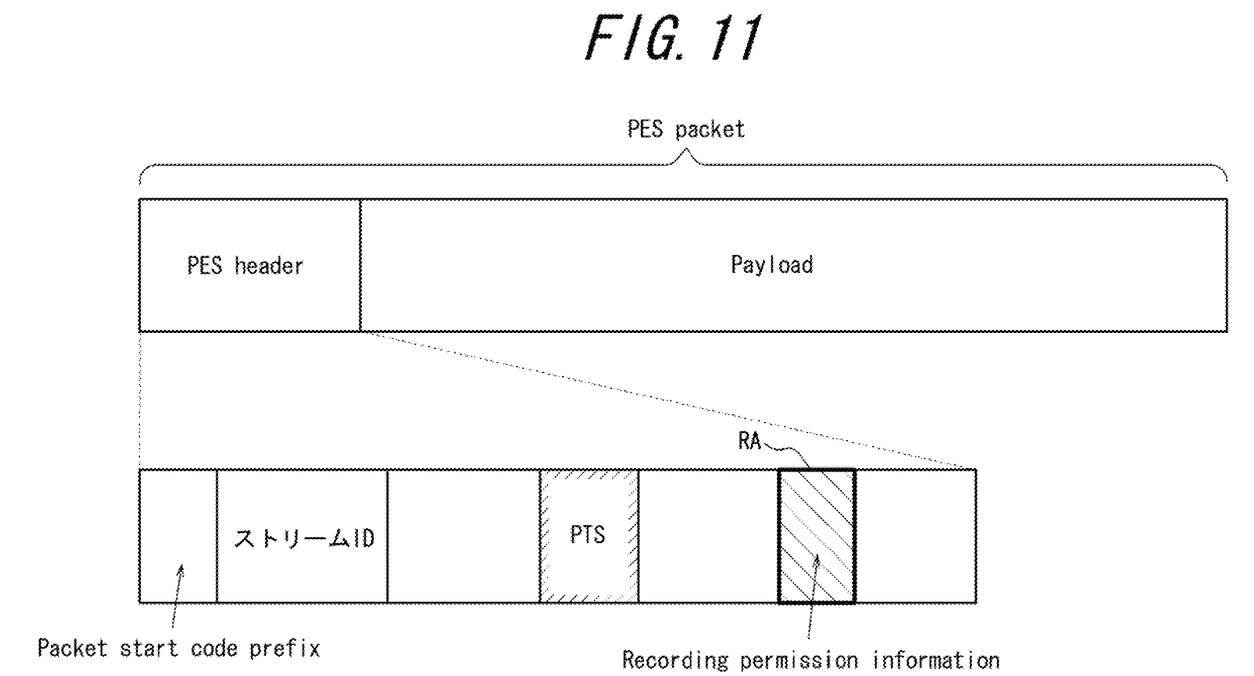
FIG. 11 is a schematic diagram of a PES packet containing the recording permission information.

FIG. 11 shows a schematic diagram of a PES packet containing the recording permission information. The PES packet is a packetized ES including one frame (one picture) of compressed and encoded video or an audio frame and, as shown in the figure, consists of a PES header and a payload. The payload includes an ES itself. The PES header includes a packet start code prefix indicating a head of the PES packet, a stream ID, which is a data identifier of the PES packet, a PTS (Presentation Time Stamp) defined by the MPEG-2 Systems (ITU-T H.222.0, ISO/IEC13818-1), which indicates a presentation time of the video/audio frame contained, and the like. The recording permission information created by the recording permission information creation unit 220 can be included, as shown in the figure, in a reserved area RA of the PES header. In addition, although the stream generation unit 230 can include the recording permission information for a plurality of video/audio frames (the information regarding whether recordings of the corresponding frames are permitted or not) in a header of a single PES packet, the recording permission information can be included also in each PES packet that contains video/audio frame permitted to be recorded. For example, a flag indicating that recording is permitted can be included in each PES header of a PES packet that contains video/audio frame permitted to be recorded. With the above two techniques, the information indicating whether recording is permitted or not is added to each frame, which enables a content holder to control recording on a frame basis.

Figure 2:
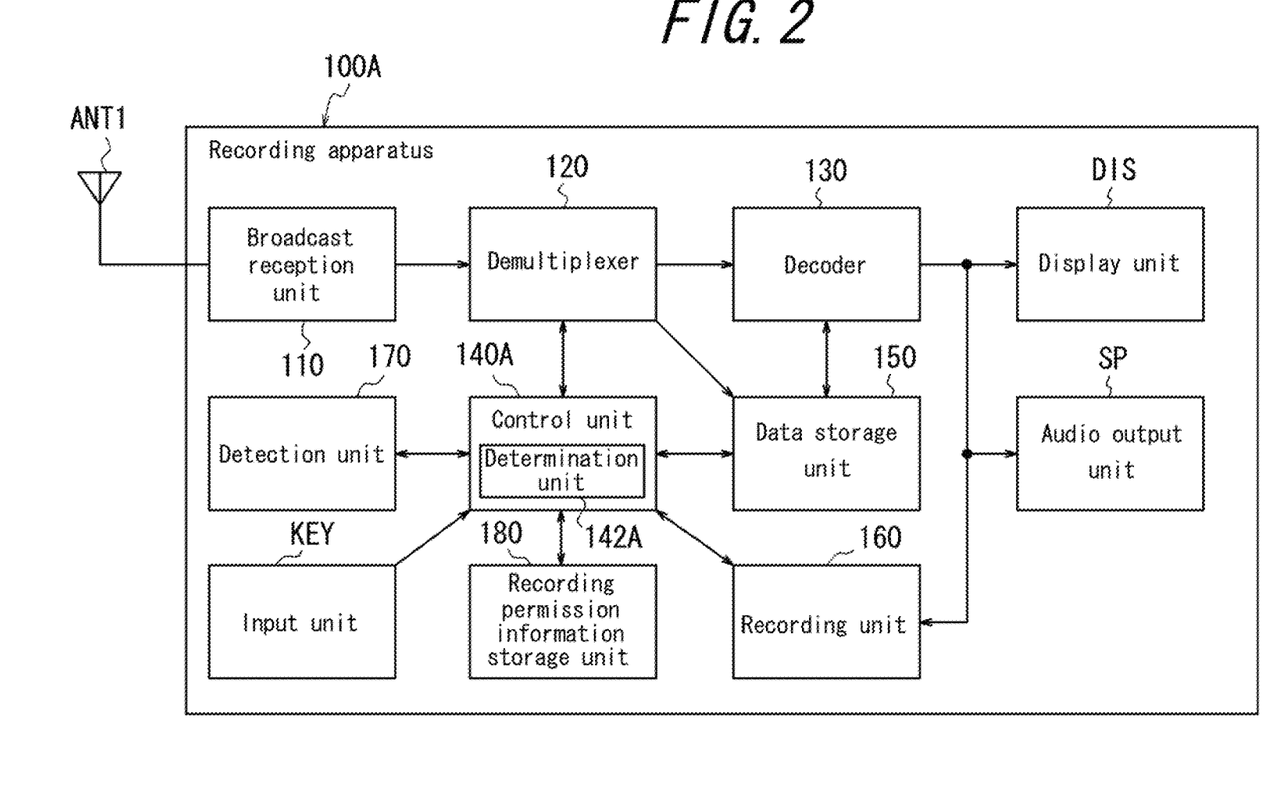
FIG. 2 is a block diagram of an embodiment of a recording apparatus according to the present invention.

Next, description of the recording apparatus is given. FIG. 2 is a block diagram of an embodiment of the recording apparatus according to the present invention. In the present embodiment, while a digital broadcast program (broadcasting range) that is prohibited from being recorded is watched, only the portion permitted to be recorded in the program is recorded in real time. The recording apparatus 100A includes an antenna ANT1, a broadcast reception unit 110, a demultiplexer 120, a decoder 130, a control unit 140A, a data storage unit 150, a recording unit 160, a detection unit 170, a recording permission information storage unit 180, an input unit KEY, a display unit DIS and an audio output unit SP. Further, the control unit 140A has a determination unit 142A.

Function of each unit of the recording apparatus 100A is described in detail. The broadcast reception unit 110 receives signals at a desired frequency (channel) among RF (radio frequency) signals including program contents of digital broadcast and transmitted, for example, from the transmission apparatus 200 through the antenna ANT1 and performs processing such as extraction of a TS and the like. In the RF signals, video data, audio data, data-carousel for data broadcast, control data, subtitle data and the like are multiplexed. The demultiplexer 120 extracts necessary data from each packet that constitutes the TS extracted by the broadcast reception unit 110. In other words, the demultiplexer 120 separates the TS extracted from the broadcast reception unit 110 into PES packets containing video data, audio data, subtitle data, data-carousel for data broadcast and control data and outputs the data included in the payload of each PES packet to the data storage unit 150. The detection unit 170 detects a PES packet containing the recording permission information in the header among PES packets separated by the demultiplexer 120. The recording permission information storage unit 180 stores the recording permission information contained in the PES packet detected by the detection unit 170. In addition, the demultiplexer 120 also extracts a PTS indicating a presentation time of each data, associates it with each data and outputs to the data storage unit 150. The data storage unit 150 stores also the PTS that has been output.

The decoder 130 decodes each data extracted by the demultiplexer 120 and outputs video, subtitle and data broadcast content to the display unit DIS, and further, outputs the audio content to the audio output unit SP. The control unit 140A controls the display unit DIS to display the video, subtitle and data broadcast content based on the PTS stored in the data storage unit 150 and further controls the audio output unit SP to output the audio content. Moreover, the control unit 140A controls the recording unit 160 to record the program content (video/audio frame) based on the instruction from the user through the input unit KEY constituted by, for example, a keypad or buttons. If the recording start time has been set by the user and the setting information is recorded in the recording unit 160, the control unit 140A controls the recording unit 160 to record the program content automatically based on the setting conditions. At this time, the determination unit 142A determines whether the frame tried to be recorded is the portion permitted to be recorded or not based on the recording permission information stored in the recording permission information storage unit 180.

Figure 6:
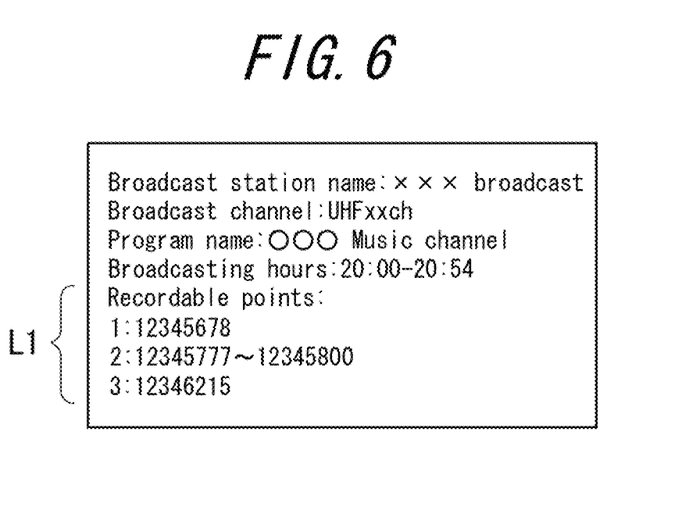
FIG. 6 is an example of the recording permission information.

FIG. 6 shows an example of the recording permission information. As shown in the figure, in the recording permission information, for example, portions that are permitted to be recorded are shown in a time stamp list L1. The determination unit 142A determines whether a video/audio frame is a portion permitted to be recorded or not based on whether the presentation time (described in the PTS) of the video/audio frame tried to be recorded corresponds to the time stamp indicated by the recording permission information. The control unit 140 controls, based on the determination result of the determination unit 142A, the recording unit 160 to record only the portions permitted to be recorded in the program content. In FIG. 6, a "broadcast station name", a "broadcast channel" and the like are described as the recording permission information. However, it should be noted that it is an example on the assumption that the recording permission information is received from EPG, and other than the above example, any information that enables the recording apparatus 100A to recognize the information of the time stamp list L1 would be used.

As another embodiment, the recording permission information may be included as a flag and the like in each PES header of the PES packets containing video/audio frames that are permitted to be recorded. In this case, the determination unit 142A determines whether or not a flag exists in a header of each packet and the control unit 140A may control the recording unit 160 to record only frames contained in packets having the flag, based on the determination result of the determination unit 142A and thereby, as described above, the recording unit 160 can record only video/audio frames permitted to be recorded.

Figure 3:
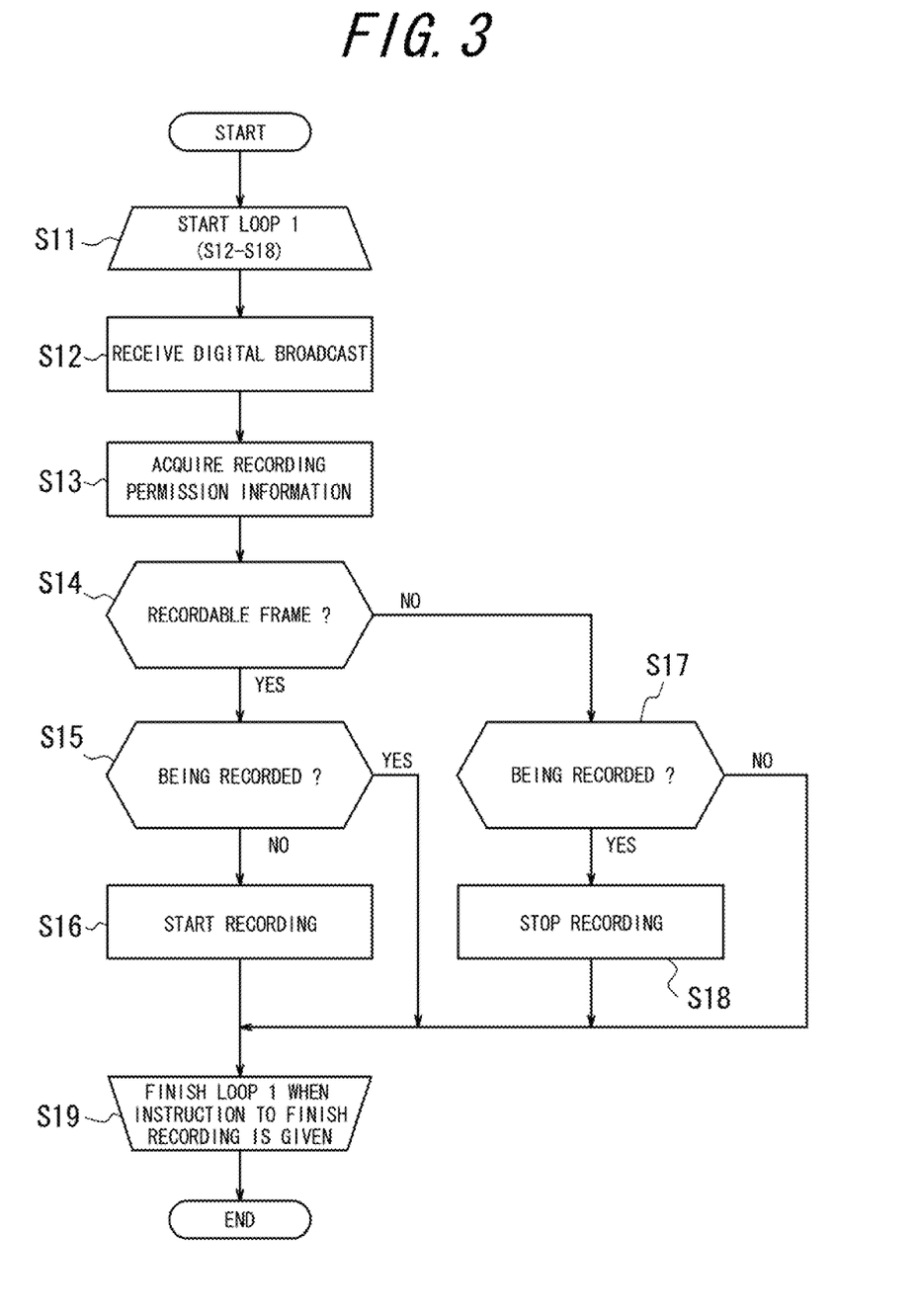
FIG. 3 is a flowchart of a recording process of a recording apparatus 100A.

The recording process of the recording apparatus 100A in FIG. 2 is described by using a flowchart. FIG. 3 is a flowchart of the recording process by the recording apparatus 100A. The recording apparatus 100A starts the recording process which is triggered by programmed recording by the user, and starts (Step S11) loop 1 (steps from S12 to S18). First, at the starting time of programmed recording, the broadcast reception unit 110 receives a digital broadcast through the antenna ANT1 and extracts a TS (step S12). Then the demultiplexer 120 demultiplexes the TS extracted by the broadcast reception unit 110 to separate it into PES packets. The detection unit 170 detects, among the separated PES packets, a PES packet containing the recording permission information and extracts the recording permission information contained (step S13). The extracted recording permission information is stored in the recording permission information storage unit 180. Further, the demultiplexer 120 also extracts a PTS indicating the presentation time of each data from the TS and outputs it to the data storage unit 150. The control unit 140A controls so that video and audio are output from the display unit DIS and the audio output unit SP, respectively, based on the PTS stored in the data storage unit 150. At this time, the determination unit 142A determines whether the video/audio frame to be output is a recordable frame that is permitted to be recorded or not based on the recording permission information (step S14). If it is determined as a recordable frame, the control unit 140A determines whether the digital broadcast being received is being recorded by the recording unit 160 or not (step S15). If it is determined as being recorded, the process moves to step S19. If it is determined as not being recorded, the process moves to step S16 and the control unit 140A controls the recording unit 160 to start recording the video/audio frame being processed.

When the video/audio frame to be output is determined as a non-recordable frame at step S14, the process moves to step S17 and the control unit 140A determines whether the digital broadcast being received is being recorded by the recording unit 160 or not. If it is determined as being recorded, the process moves to step S18 and the control unit 140A controls the recording unit 160 to stop recording. The recording apparatus 100A continues the recording process from steps S12 to S18 until the programmed recording end time or until instruction to stop recording of the digital broadcast is given. At step S19, when there is a command to finish the recording, for example, by an instruction from the user or due to expiration of the recording time period, the control unit 140A finishes loop 1, and then finishes the recording by the recording unit 160. In other words, when the user records program content, the recording apparatus according to the present invention records only video/audio frames that are permitted to be recorded and does not record frames that are not permitted to be recorded.

In the above flowchart, the recording apparatus may play the digital broadcast program content that has been recorded while recording the program content. However, it should be noted that the present invention is not limited thereto. Therefore, the recorded program content is not necessarily played. Further, a user can watch the digital broadcast program content being received in real time while recording the program content.

Next, another embodiment of the recording apparatus according to the present invention is described. In the present embodiment, among digital broadcast programs (broadcasting range) that are prohibited from being recorded, the information regarding a portion permitted to be recorded is previously acquired from a server and the like through the network and the like, and based on the information, the portion permitted to be recorded is recorded. In the present embodiment, the user can know the portion permitted to be recorded previously, and thereby the user can program the recording apparatus to record the portion previously.

Figure 12:
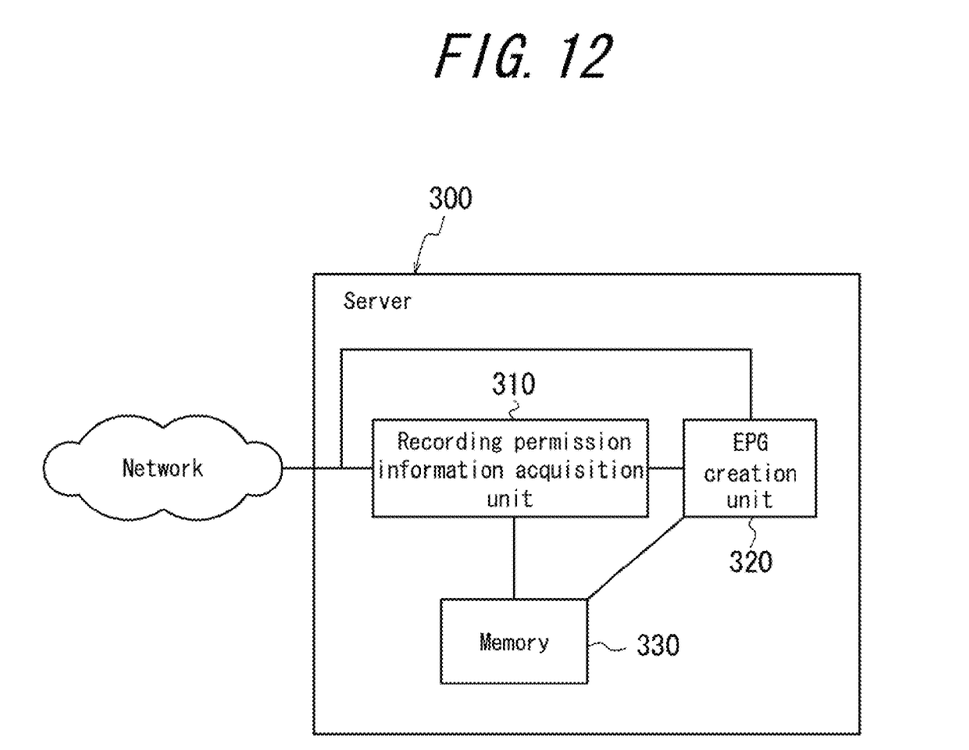
FIG. 12 is a schematic block diagram of a server.

Before describing the recording apparatus according to the present embodiment, description of a server that creates the recording permission information and provides it to the recording apparatus is given. FIG. 12 is a schematic block diagram of the server. As shown in the figure, the server 300 includes a recording permission information acquisition unit 310, an EPG creation unit 320 and a memory 330. The recording permission information acquisition unit 310 acquires the recording permission information transmitted from, for example, a content creator or the broadcast apparatus 200, through a network. In the recording permission information, as shown in FIG. 6, for example, a broadcast station name, a broadcast channel, a program name, broadcasting hours, and a time stamp list L1 of recordable points are described. The EPG creation unit 320 creates an EPG based on the recording permission information, as shown in FIG. 6, acquired by the recording permission information acquisition unit 310. Further, the EPG created is provided through the network. Description of the EPG will be given later.

Figure 4:
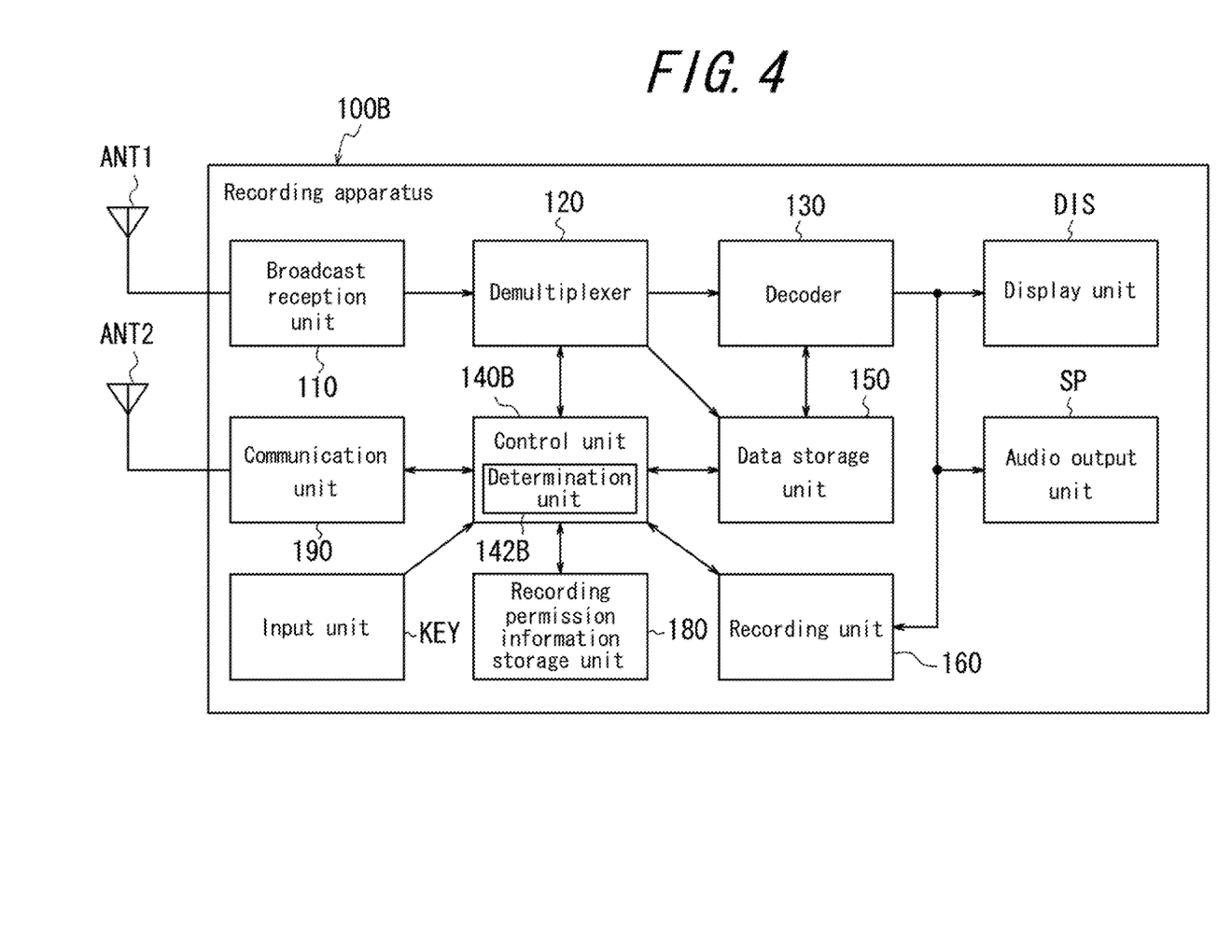
FIG. 4 is a schematic block diagram of the recording apparatus according to an embodiment of the present invention.

Here description is returned to the recording apparatus according to the present embodiment. FIG. 4 is a schematic block diagram of the recording apparatus according to the present embodiment. As shown in the figure, a recording apparatus 100B includes a broadcast reception unit 110, a demultiplexer 120, a decoder 130, a control unit 140B, a data storage unit 150, a recording unit 160, a recording permission information storage unit 180, a communication unit 190, antennas ANT1 and ANT2, an input unit KEY, a display unit DIS and an audio output unit SP. In addition, the control unit 140B includes a determination unit 142B. Since the units having the same reference numerals as those of the recording apparatus 100A shown in FIG. 2 have the same functions, descriptions thereof are omitted.

Description of the functions of elements specific to the recording apparatus 100B is given. The communication unit 190 acquires the recording permission information (EPG or the like) provided by the server 300 or the like through the antenna ANT2. The recording permission information acquired by the communication unit 190 is stored in the recording permission information storage unit 180. The recording permission information indicates recordable portions by specifying times. Therefore, the determination unit 142B determines whether a video/audio frame is recordable or not based on whether the presentation time of the video/audio frame tried to be recorded described in the PTS corresponds to the time indicated by the recording permission information. In other words, as in the case of the recording apparatus 100A, the control unit 140B controls the recording unit 160 to record program content (video/audio data). At this time, based on the determination result by the determination unit 142B, the control unit 140B controls the recording unit 160 to record only the portions corresponding to the presentation times permitted to be recorded in the program content. In other words, the control unit 140B controls the recording unit 160 to record a video/audio frame tried to be recorded as a recordable frame if the presentation time of the frame corresponds to the time described in the recording permission information stored in the recording permission information storage unit 180 and if not, controls the recording unit 160 not to record the frame as a frame prohibited from being recorded.

Figure 5:
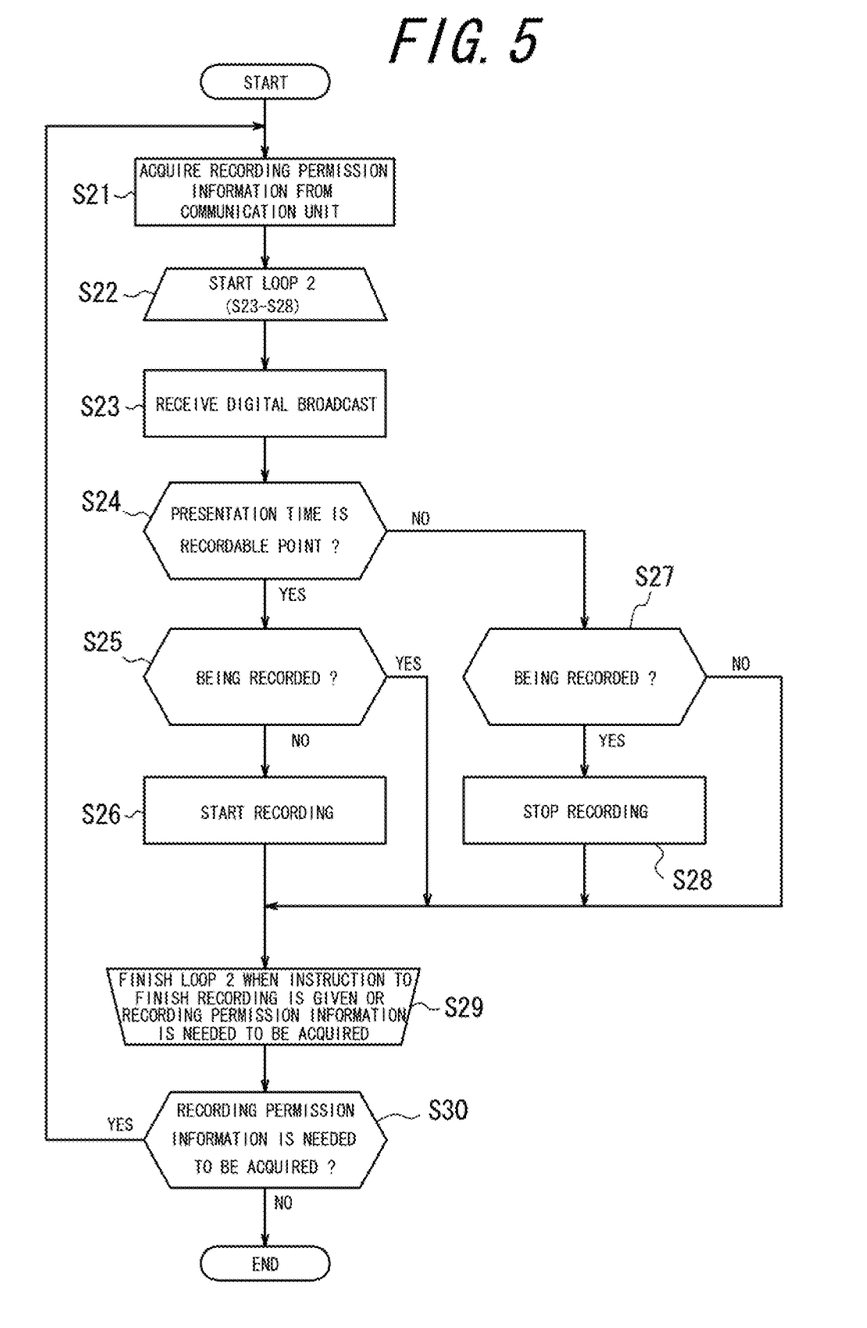
FIG. 5 is a flowchart of a recording process of a recording apparatus 100B.

The recording process of the recording apparatus 100B shown in FIG. 4 is described using a flowchart. FIG. 5 is a flowchart of the recording process of the recording apparatus 100B. First, the recording apparatus 100B acquires the recording permission information through the communication unit 190 (step S21), and then starts (step S22) loop 2 (steps from S23 to S28). In loop 2, being triggered by the programmed recording by a user, for example, when it comes a start time of the programmed recording, in order to start the recording process, first the broadcast reception unit 110 receives the digital broadcast through the antenna ANT1 and extracts TS (step S23). Here, the demultiplexer 120 extracts also PTS that shows the presentation time of each data from the TS and outputs it to the data storage unit 150. The control unit 140B controls, based on the PTS stored in the data storage unit 150, so that video and audio are output from the display unit DIS and the audio output unit SP, respectively. At this time, the determination unit 142B determines whether or not the presentation time of the video or audio frame to be output corresponds to the recordable point described in the recording permission information stored in the recording permission information storage unit 180 (step S24). In other words, the determination unit 142B determines the frame as a recordable frame if the presentation time of the frame to be output corresponds to the time stored in the recording permission information storage unit 180 and if not, determines the frame as a frame prohibited to be recorded.

The process from steps S25 to S28 are the same as that of steps from S15 to S18 of the recording apparatus 100A shown in FIG. 3, and thus descriptions thereof are omitted. However, in the present embodiment, at step S29, loop 2 is finished at the programmed recording end time or when instruction to finish recording is given, or when the recording permission information acquired at step S21 is outdated and requires updating. Thereafter, at step S30, the determination unit 142B determines whether it is necessary to acquire recording permission information or not. If the determination unit 142B determines that it is necessary, the process moves back to step S21 to acquire the recording permission information newly from the communication unit 190 and if it is determined to be not necessary, the process is ended.

Further, in the above flowchart, the recorded program content does not always have to be played. In addition, it should be noted that the digital broadcast program content being received can be watched in real time while being recorded.

Figure 7:
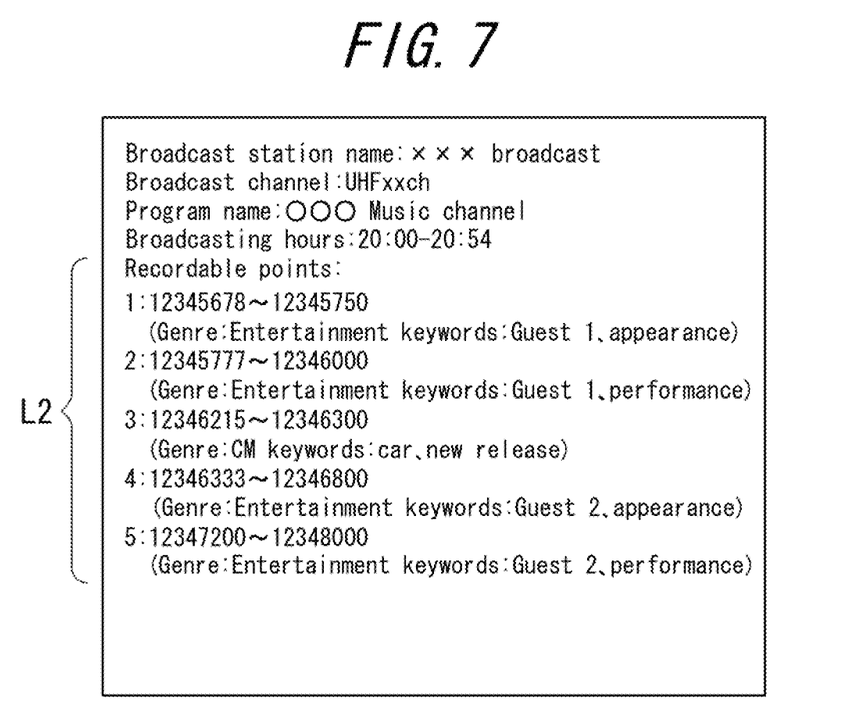
FIG. 7 is another example of the recording permission information.

The recording apparatus 100B can acquire the recording permission information previously from the communication unit 190. Thus it has an advantage of being able to notify the user of the recordable portions in advance. The advantage is described below. Similarly to FIG. 6, FIG. 7 shows the contents of the recording permission information. Different from FIG. 6, in FIG. 7, the time stamp list L2 indicating recordable points includes attribute information (genre, keyword and the like) of content presented at the time corresponding to the time stamp. For example, in FIG. 7, with respect to the program of "ooo music channel" that is prohibited from being recorded, it is possible to notify the user in advance that, scenes in which Guest 1 and Guest 2 appear and play music and a vehicle commercial are permitted to be recorded. On the contrary, in the case of the recording permission information shown in FIG. 6, since the recording apparatus 100A acquires it in real time, it is not possible to notify the user of the details of the content to be presented at the recordable point in advance.

Figure 8:
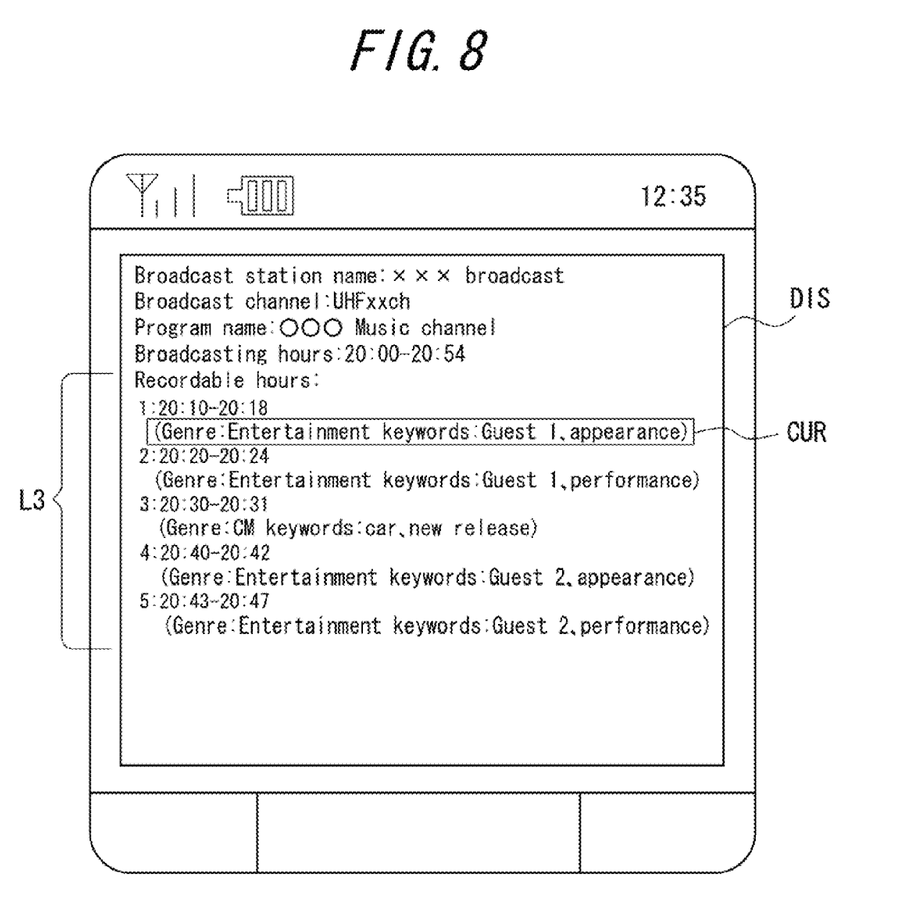
FIG. 8 is a display example of EPG created by a server 300 based on the recording permission information in FIG. 7.

FIG. 8 shows, as a display example on the display unit DIS, an EPG created in the server 300 through the EPG creation unit 320 based on the recording permission information shown in FIG. 7. The recordable time list L3 in FIG. 8 corresponds to the time stamp list L2 of the recording permission information in FIG. 7. The user can select, in the EPG displayed on the display unit DIS, the content he/she wants to record by using a cursor CUR, for example. In this manner, the user can know the recordable portions with the contents thereof. Thus the user does not need to set the programmed time period longer as in the conventional manner. Further, the user can specify his/her desired genres or keywords previously and capture only video/audio frames that relate to the genres or keywords. Moreover, the user programs the recording apparatus 100B to record content based on the presentation time of the content specified by PTS. Therefore, unlike the conventional method in which a physical time is set, there is no problem of not being able to record the desired content caused by a difference between the time of the content to be recorded and the programmed time, and thus the usability can be improved. Further, since the unnecessary portions are not recorded, waste of memory of the recording apparatus can be prevented.

Figure 9:
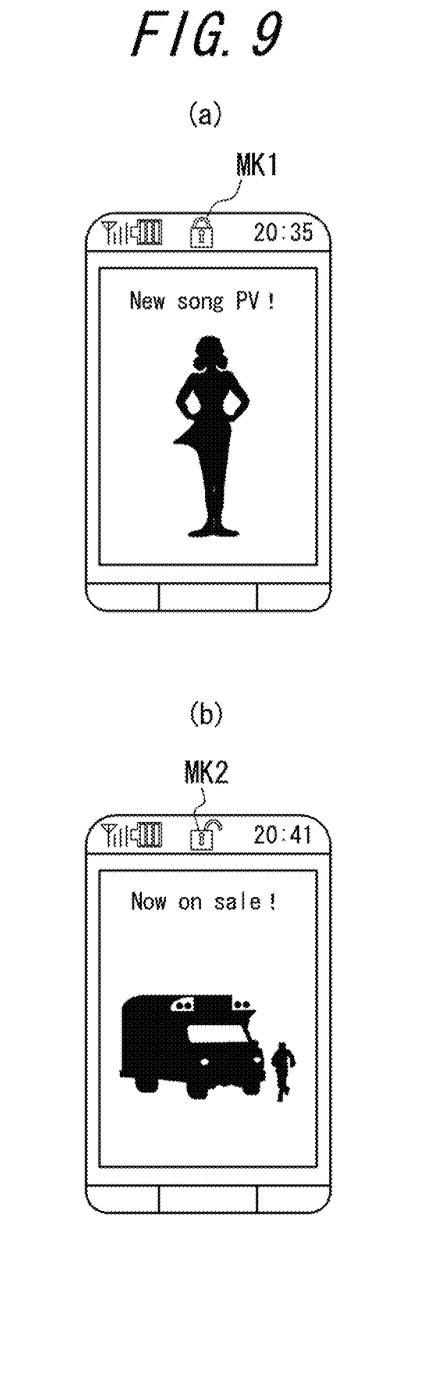
FIG. 9 is an example of a display unit that shows whether the content being watched is recordable or not.

In the embodiments of the recording apparatuses 100A and 100B, a technique to record all portions permitted to be recorded in a program prohibited from being recorded has been described. However, there may be some cases where the user wants to record only desired portions (video/audio frames) while watching a program. In this case, based on the previously acquired recording permission information or the presence or absence of a flag indicating whether recordable or not, which is included in a PES header, and the like, whether the video/audio frame being output is recordable or not may be displayed on the display unit DIS. FIG. 9 shows its example. In FIG. 9(a), the video that is not permitted to be recorded is output to the display unit DIS, and, for example, a mark MK1 showing the state where a padlock is locked is displayed. On the other hand, in the case of the video that is permitted to be recorded, the state where the padlock is unlocked like the mark MK2 in FIG. 9(b) is displayed on the display unit DIS. Thus the user can recognize immediately whether the video he/she is watching is recordable or not.

In addition, the recording permission information may be included in the PSI/SI information such as PMT and then transmitted. As mentioned above, although the copy control information called copy control descriptor is originally included in the PMT, copying can be controlled only on a program basis or on an ES basis. Therefore, in the present invention, the copy control descriptor may be extended to specify presentation times of video/audio frames of the portion permitted to be recorded, and included in the reserved area of the PMT as the recording permission information. Thus based on the copy control descriptor specified in the PMT, partial recording control can be performed on the program prohibited from being recorded as a whole.

Further, it is considered that a packet containing a frame to be displayed at the presentation time specified by the recording permission information may be lost. In this case, the frame contained in the packet can not be recorded. As a countermeasure, when the control units 140A and 140B of the recording apparatuses 100A and 100B detect respectively that a packet containing a frame to be displayed at the presentation time specified by the recording permission information is lost, the recording unit 160 may be controlled to record a previous P frame or the next I frame. Thus the desired video frame can be captured even if the video frame that the user wants to record (capture) as a still image is lost.

Moreover, the recording permission information can be transmitted by being included in a data broadcast multiplexed with broadcasting waves of the digital broadcast. In addition, a script for the recording apparatus to store the recording permission information into the recording permission information storage unit 180 when acquiring the recording permission information included in the data broadcast, for example, is described in BML (Broadcast Markup Language) of the data broadcast. This process is similar to, for example, the function for storing the information specific to each broadcaster defined by the ARIB STD-B24 in a nonvolatile RAM (NVRAM). Thus the recording apparatus can acquire the recording permission information in advance and can use the recording permission information when determining whether recordable or not.

In the recording permission information, it is preferable that the presentation time of IDR picture defined by H.264/MPEG-4 AVC (ISO/IEC 14496-10) is set as the presentation time to specify the recordable range. This increases the probability that video/audio content can be presented (restore) when compared to recording of a P picture that requires reception of the information of IDR picture in advance. Therefore, it is possible to improve tolerance to error such as packet loss.

The advantages of the present invention are described again. With the copy control descriptor according to the conventional art, the copy restriction range can be specified only at a program level, that is, an ES level. Therefore, even if this technique is applied to the restriction of recording (video and audio recording) of a paid broadcast of the terrestrial digital broadcasting that is expected to be introduced in the future, a content holder or a service provider will not be able to operate flexible copy restrictions such as recording of one portion of a program or capture of only one scene. Thus there is a problem that the viewer cannot record the useful information. In contrast, in the present invention, when recording of digital broadcast is prohibited on a program basis, recording a portion of the program can be permitted. Therefore, it is possible to manage the content protection with a flexible manner that allows a user to record the useful information and that is excellent in usability. In addition, since recording is programmed based on the presentation time of the content specified by PTS, unlike the conventional method that specifies the physical time, there is no problem of not being able to record the desired content due to a difference between the broadcasting time of the content tried to be recorded and the programmed time, and thus the usability can be improved. Further, since the unnecessary portions are not recorded, it is possible to avoid using a memory of the recording apparatus wastefully.

While the present invention has been described based on the various diagrams and embodiments, it should be noted that those skilled in the art can make various variations and modifications easily based on the present disclosure. Therefore, such variations and modifications are included in the scope of the present invention. For example, function and the like that are included in each part and each component can be rearranged so as not to be logically inconsistent. Further, a plurality of components can be combined or divided.

For example, in the description of the embodiments, although the aspect by which all of the recordable portions that are specified by the recording permission information are automatically recorded is described, it should be noted that the present invention is not limited to the aspect. For example, the user may previously select the portions that are automatically recorded or may capture all of the recordable portions in the meantime and record the captured portions after asking the user if storing (recording) the portions is needed by displaying a message on the display.

The invention claimed is:

1. A digital broadcast recording apparatus, comprising:
 a recording unit for recording a digital broadcast;
 a detection unit for detecting, from a stream of a program prohibited from being recorded in the digital broadcast, a packet containing information regarding a portion permitted to be recorded in the program prohibited from being recorded, wherein the information regarding a portion permitted to be recorded is a presentation time identifier of the portion to be recorded; and
 a control unit for controlling, when the recording unit records the program prohibited from being recorded, the recording unit to record the portion permitted to be recorded based on the presentation time identifier information contained in the packet detected by the detection unit.

2. The digital broadcast recording apparatus according to claim 1, wherein
 the detection unit detects a PES packet that includes a flag indicating that recording is permitted in a header, and the control unit controls the recording unit to record, in the program prohibited from being recorded, content contained in the PES packet that includes the flag in the header.

3. A digital broadcast recording apparatus, comprising:
a recording unit for recording a digital broadcast;
an acquisition unit for acquiring recording permission information indicating a presentation time of a portion permitted to be recorded in a program prohibited from being recorded in the digital broadcast;
a storage unit for storing the recording permission information presentation time acquired by the acquisition unit; and
a control unit for controlling, when the recording unit records the program prohibited from being recorded, the recording unit to record the portion permitted to be recorded based on comparing the presentation time of the portion with the recording permission presentation time information stored in the storage unit.

* * * * *